United States Patent
Lin et al.

(10) Patent No.: US 7,626,764 B2
(45) Date of Patent: Dec. 1, 2009

(54) PROJECTING LENS SYSTEM

(75) Inventors: Chun-Ling Lin, Taipei Hsien (TW); Chun-Hsiang Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/959,218

(22) Filed: Dec. 18, 2007

(65) Prior Publication Data

US 2009/0073571 A1 Mar. 19, 2009

(30) Foreign Application Priority Data

Sep. 13, 2007 (CN) .................. 2007 1 0201679

(51) Int. Cl.
 G02B 3/00 (2006.01)
 G02B 9/00 (2006.01)
 G02B 9/34 (2006.01)

(52) U.S. Cl. .................. 359/650; 359/649; 359/774

(58) Field of Classification Search ......... 359/771–774, 359/755, 756, 757, 758, 763, 764, 649–650
See application file for complete search history.

(56) References Cited

U.S. PATENT DOCUMENTS

| 4,484,802 | A  | * | 11/1984 | Kikuchi ................. 359/774 |
| 4,695,136 | A  |   | 9/1987 | Schitthof |
| 7,206,143 | B2 | * | 4/2007 | Kamo et al. ............ 359/771 |
| 2002/0001136 | A1 | * | 1/2002 | Takahashi et al. ........ 359/644 |
| 2003/0048547 | A1 | * | 3/2003 | Schuster ............... 359/781 |
| 2005/0024748 | A1 | * | 2/2005 | Amanai ................ 359/774 |
| 2006/0245079 | A1 | * | 11/2006 | Yamamoto et al. ....... 359/690 |
| 2007/0008625 | A1 | * | 1/2007 | Park et al. ............. 359/642 |

* cited by examiner

*Primary Examiner*—Darryl J Collins
*Assistant Examiner*—Zachary Wilkes
(74) *Attorney, Agent, or Firm*—Zhigang Ma

(57) ABSTRACT

A projecting lens system includes a first lens positive in power, a second lens negative in power, a third lens positive in power, and a fourth lens positive in power. The projecting lens system meets a criteria of 1.4<TT/f<1.7; where TT denotes a total length of the projecting lens system and f denotes an effective focal length of the projecting lens system.

3 Claims, 10 Drawing Sheets

PROJECTING LENS SYSTEM

TECHNICAL FIELD

The present invention relates to a lens system, and more particularly to a projecting lens system for use in projectors.

DESCRIPTION OF RELATED ART

In order to obtain a sharp projection image and reduce a size of projectors, such as with digital light processing (DLP) projectors, liquid crystal display (LCD) projectors, or liquid crystal on silicon (LCOS) projectors, projection lenses with high resolution but short overall length (the distance between the magnification-side surface of such a projection lens and a surface of a spatial light modulator (SLM), e.g. digital micromirror device (DMD), LCD panel, or LCOS panel, equipped in a projector facing the projection lens) are needed. Factors affecting both the resolution and the overall length of the projection lens, such as the number and position of lenses employed, the refraction power distributions of the employed lenses, and the shape of each of the employed lenses, complicate any attempt at increasing resolution and shorting overall length of projection lenses. For example, reducing the number of lenses can shorten the overall length of the projection lens, but resolution will suffer; conversely, increasing the number of lenses can increase resolution, but increase overall length of the projection lens.

For a projecting lens in a projector, good image quality and compact size is required for portability. Additionally, wide-angle projection ability to achieve a larger projected image in a limited space is desired. Therefore, it is desirable to provide a projecting lens system with simple structure, compact size, fine optical performance, and low production cost.

SUMMARY

In accordance with a present embodiment, a projecting lens system includes a first lens positive in power, a second lens negative in power, a third lens positive in power, and a fourth lens positive in power. The projecting lens system meets a criteria of $1.4<TT/f<1.7$; where TT denotes a total length of the projecting lens system and f denotes an effective focal length of the projecting lens system.

Other novel features and advantages will be drawn from the following detailed description of at least one preferred embodiment, when considered conjunction with the attached drawings.

BRIEF DESCRIPTION OF THE DRAWINGS

Many aspects of the present projecting lens system can be better understood with reference to the following drawings. The components in the drawings are not necessarily drawn to scale, the emphasis instead being placed upon clearly illustrating the principles of the present projecting lens system. Moreover, in the drawings, like reference numerals designate corresponding parts throughout the several views.

DETAILED DESCRIPTION OF THE EMBODIMENTS

Embodiments will now be described in detail below, with reference to the drawings.

Figure 1:
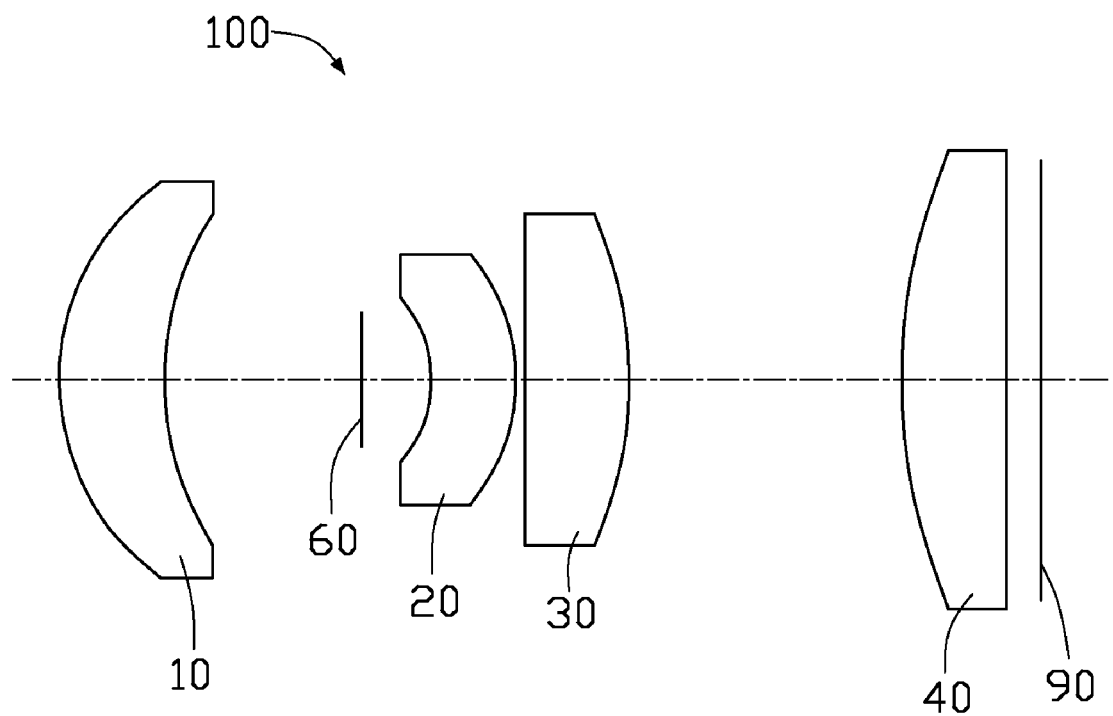
FIG. 1 is a schematic drawing of a projecting lens system according to a first present embodiment.

Referring to FIG. 1, a projecting lens system 100 according to a present embodiment is shown. The projecting lens system 100 includes a first lens 10 positive in power, a second lens 20 negative in power, a third lens 30 positive in power, and a fourth lens 40 positive in power.

The projecting lens system 100 shown in this embodiment is configured for utilization in a DLP projector. A spatial light modulator (SLM) 90, for example, a digital micromirror device (DMD), modulates light signals for projection through the projecting lens system 100. The light signals sequentially transmit through the fourth lens 40, the third lens 30, the second lens 20, the first lens 10, and subsequently projects onto a projecting screen (not shown) for producing images.

In order to provide the projecting lens system 100 with a compact size and low production cost, the projecting lens system 100 meets the following conditions:

$$1.4 < TT/f < 1.7, \quad (1)$$

where TT denotes a total length of the projecting lens system 100 and represents a distance between a screen-side surface of the first lens 10 and the SLM 90; f denotes an effective focal length of the projecting lens system 100. Condition (1) defines a compact total length of the projecting lens system 100. Meanwhile, the arrangement of the first lens 10, the second lens 20, and the third lens 30 provides balance between total length and spherical optical aberration of the projecting lens system 100.

Preferably, the projecting lens system 100 further meets the following condition:

$$BFL_3/f > 0.79, \quad (2)$$

where $BFL_3$ denotes a back focal length and represents a distance between the a SLM-side surface of the third lens 30 and the SLM 90. Condition (2) defines the back focal length of the projecting lens system 100 in a proper length to make other optical devices of the projector (e.g. an optical engine) installable between the third lens 30 and the SLM 90.

Preferably, the projecting lens system 100 further meets the following condition:

$$1.4 < f_4/f < 1.6 \quad (3)$$

where $f_4$ denotes a focal length of the fourth lens 40. Condition (3) defines a total optical power requirement of the projecting lens system 100 to eliminate monochromatic aberrations caused by the fourth lens 40 and control the total length of the projecting lens system 100 to be in an acceptable range. Condition (3) ensures the projecting lens system 100 possesses a qualified projecting image quality in a telecentric end of the projecting lens system 100.

Embodiment 1: The following table 1 shows specifications of a first embodiment of the projecting lens system 100, wherein TT=135 mm; f=82.91 mm; $BFL_3$=66.83 mm; $f_4$=124.74 mm; $AVE(Vb_{1-3})$55.5322; $F_{No}$=3.41; $2_\omega$=33.72°.

TABLE 1

| Projecting lens system 100 | Radius of curvature(mm) | Thickness(mm) | Reflective index | Abbe number |
|---|---|---|---|---|
| Screen-side surface of the first lens 10 | 28.05737 | 12 | 1.696797 | 55.5322 |
| SLM-side surface of the first lens 10 | 35.18796 | 22.53765 | — | — |
| Aperture stop 60 | ∞ | 7.933927 | — | — |
| Screen-side surface of the second lens 20 | −14.61593 | 9.688149 | 1.84666 | 23.7779 |
| SLM-side surface of the second lens 20 | −22.67261 | 1 | — | — |
| Screen-side surface of the third lens 30 | ∞ | 12 | 1.696797 | 53.5322 |
| SLM-side surface of the third lens 30 | −47.49873 | 53.24028 | — | — |
| Screen-side surface of the fourth lens 40 | 67.60116 | 12 | 1.5168 | 64.1673 |
| SLM-side surface of the fourth lens 40 | ∞ | 3 | — | — |

Figure 2:
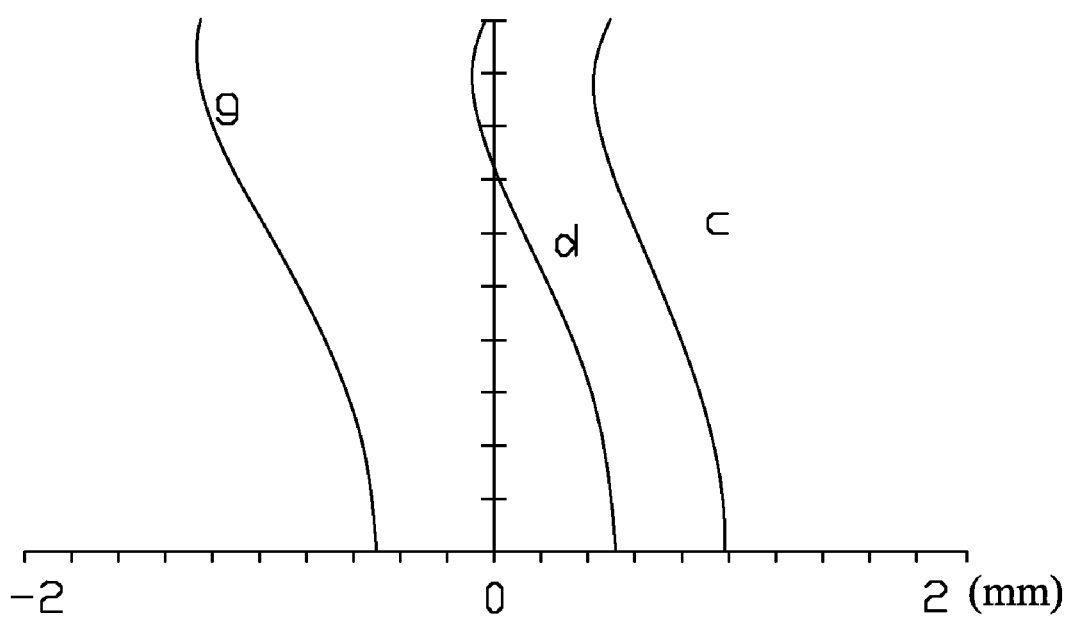
FIG. 2 is a spherical aberration diagram of the projecting lens system in FIG. 1.
Figure 3:
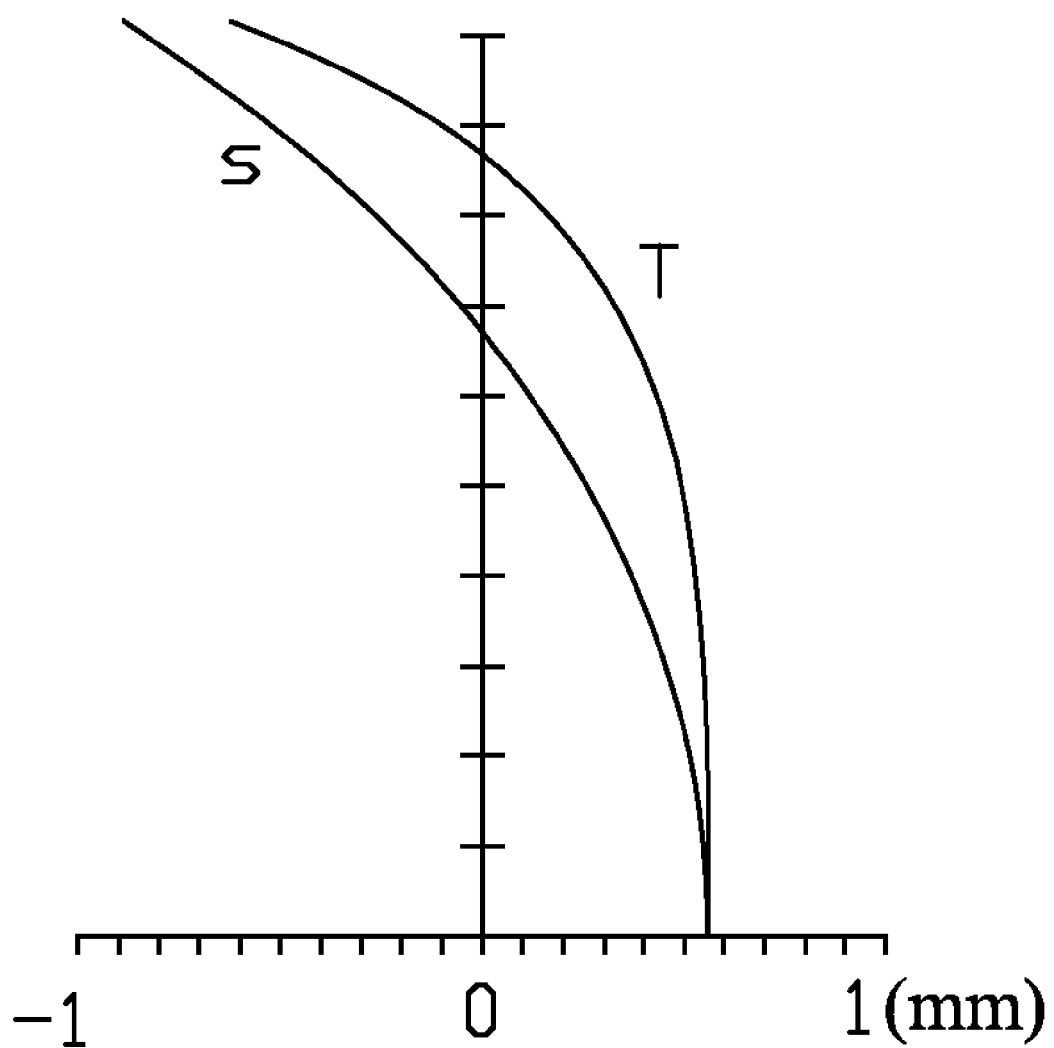
FIG. 3 is a field curvature diagram of the projecting lens system in FIG. 1.
Figure 4:
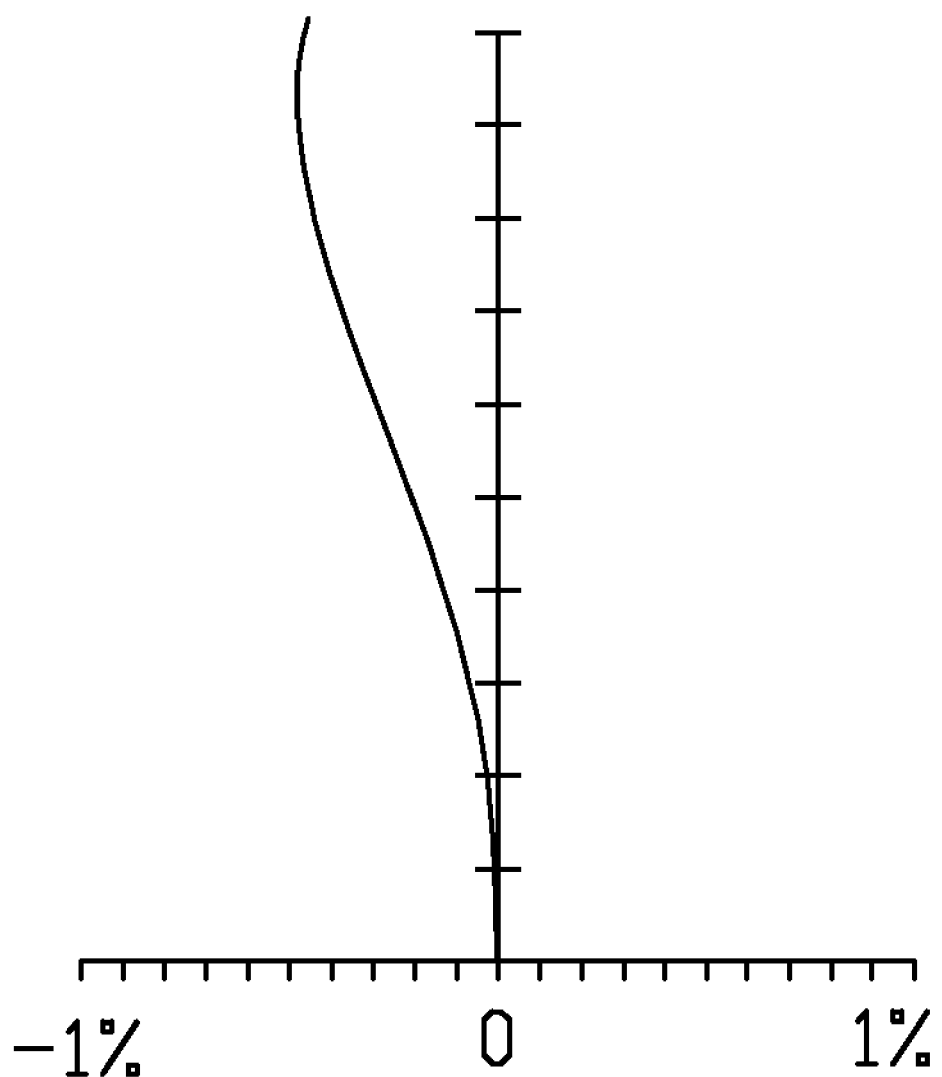
FIG. 4 is a distortion diagram of the projecting lens system in FIG. 1.

The spherical aberration diagram, the field curvature diagram, and the distortion diagram of the projecting lens system 100 are respectively shown in FIGS. 2~4. Spherical aberrations of line g ($\lambda$=486 nm) and line d ($\lambda$=587 nm) and line c ($\lambda$=656 nm) are shown in FIG. 2. Generally, spherical aberration of visible light (with a wavelength between 400~700 nm) of the projecting lens system 100 in the first embodiment is within a range of −2 mm to 2 mm. The sagittal field curvature and tangential field curvature shown in FIG. 3 are kept within a range of −0.1 mm to 0.1 mm. The distortion in FIG. 4 falls within a range of −1% to 1%. Obviously, the spherical aberration, field curvature, and distortion are well controlled in the first embodiment of the projecting lens system 100.

Embodiment 2: The following table 2 shows specifications of a second embodiment of the projecting lens system 100, aperture stop 60 can be formed by applying an opaque material on an outer rim of the screen-side surface of the second lens 20.

Preferably, the first lens 10, the second lens 20, the third lens 30, and the fourth lens 40 in the projecting lens system 100 are made of glass to achieve better image quality.

Referring to FIGS. 2~10, embodiments of the projecting lens system 100 are described by the following. The first lens 10, the second lens 20, the third lens 30, and the fourth lens 40 as described in the following embodiments are all spherical lenses. In these embodiments, "f" represents a focal length of the projecting lens system 100; "FNo" represents the aperture F-number; "2$\omega$" represents a field angle.

TABLE 2

| Projecting lens system 100 | Radius of curvature(mm) | Thickness(mm) | Reflective index | Abbe number |
|---|---|---|---|---|
| Screen-side surface of the first lens 10 | 25.25499 | 12.5 | 1.62041 | 60.3236 |
| SLM-side surface of the first lens 10 | 32.98193 | 71.5604 | — | — |
| Aperture stop 60 | ∞ | 8.639082 | — | — |
| Screen-side surface of the second lens 20 | −13.55623 | 8.940455 | 1.755201 | 27.5795 |
| SLM-side surface of the second lens 20 | −20.87062 | 1 | — | — |
| Screen-side surface of the third lens 30 | ∞ | 12.5 | 1.62041 | 60.3236 |
| SLM-side surface of the third lens 30 | −43.81359 | 51.76006 | — | — |
| Screen-side surface of the fourth lens 40 | 93.72847 | 12.6 | 1.743972 | 44.8504 |
| SLM-side surface of the fourth lens 40 | ∞ | 3 | — | — | wherein TT=130 mm; f=82.52 mm; $BFL_3$=66.86 mm; $f_4$=125.98 mm; $AVE(Vb_{1-3})$=60.3236; $F_{No}$=3.41; 2$\omega$=34°.

In order to reduce chromatic aberrations, especially the chromation difference of magnification, the projecting lens system 100 further meets the following condition:

$$AVE(Vb_{1-3}) > 55 \quad (4)$$

where, $AVE(Vb_{1-3})$ denotes an average value of the Abbe numbers of the first lens 10 and the third lens 30. Condition (4) guarantees a balance between a compact total length of the projecting lens system 100 and keeping the chromatic difference at a minimum.

Figure 5:
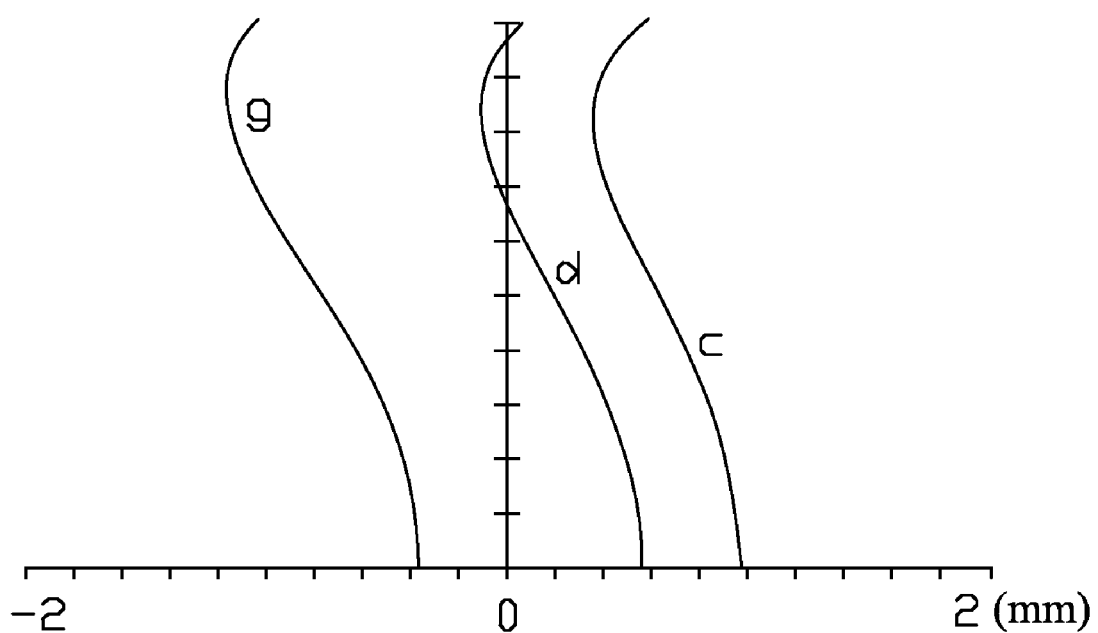
FIG. 5 is a spherical aberration diagram of the projecting lens system according to a second present embodiment.
Figure 6:
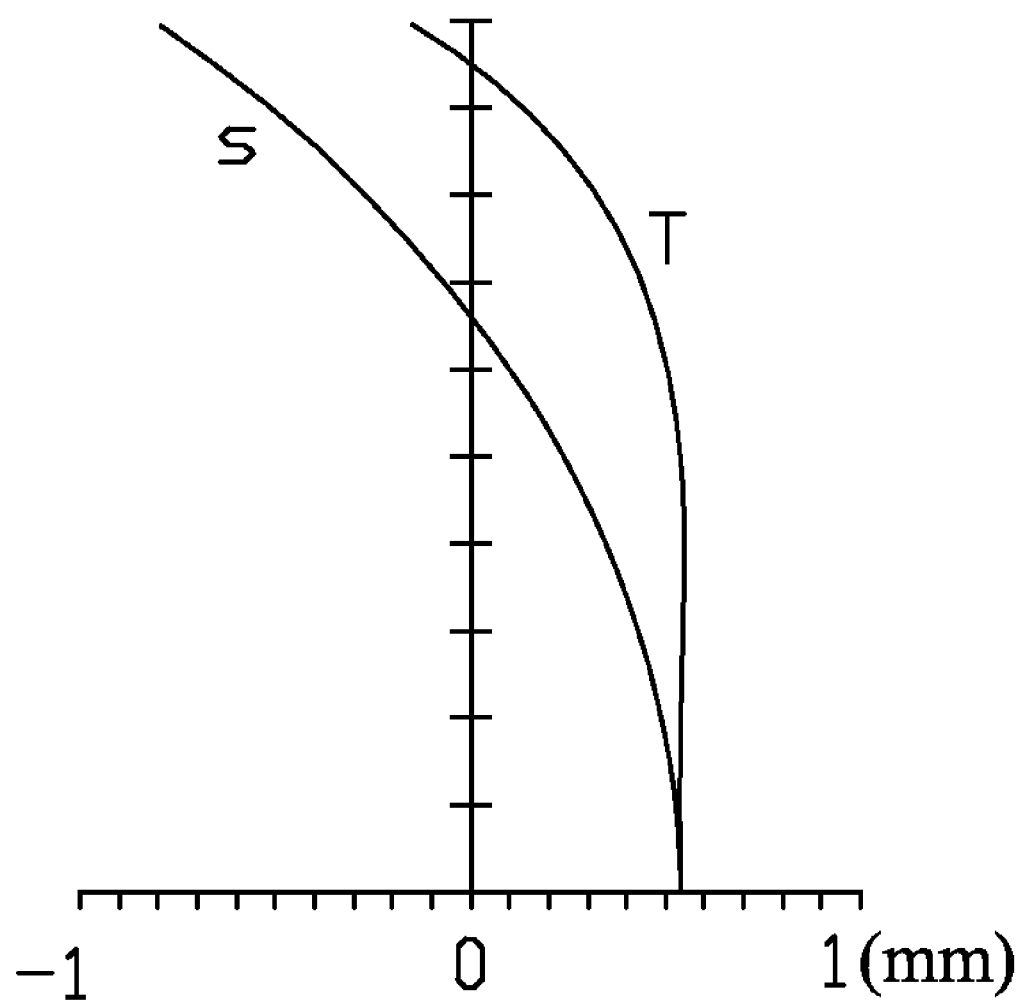
FIG. 6 is a field curvature diagram of the projecting lens system in FIG. 5.
Figure 7:
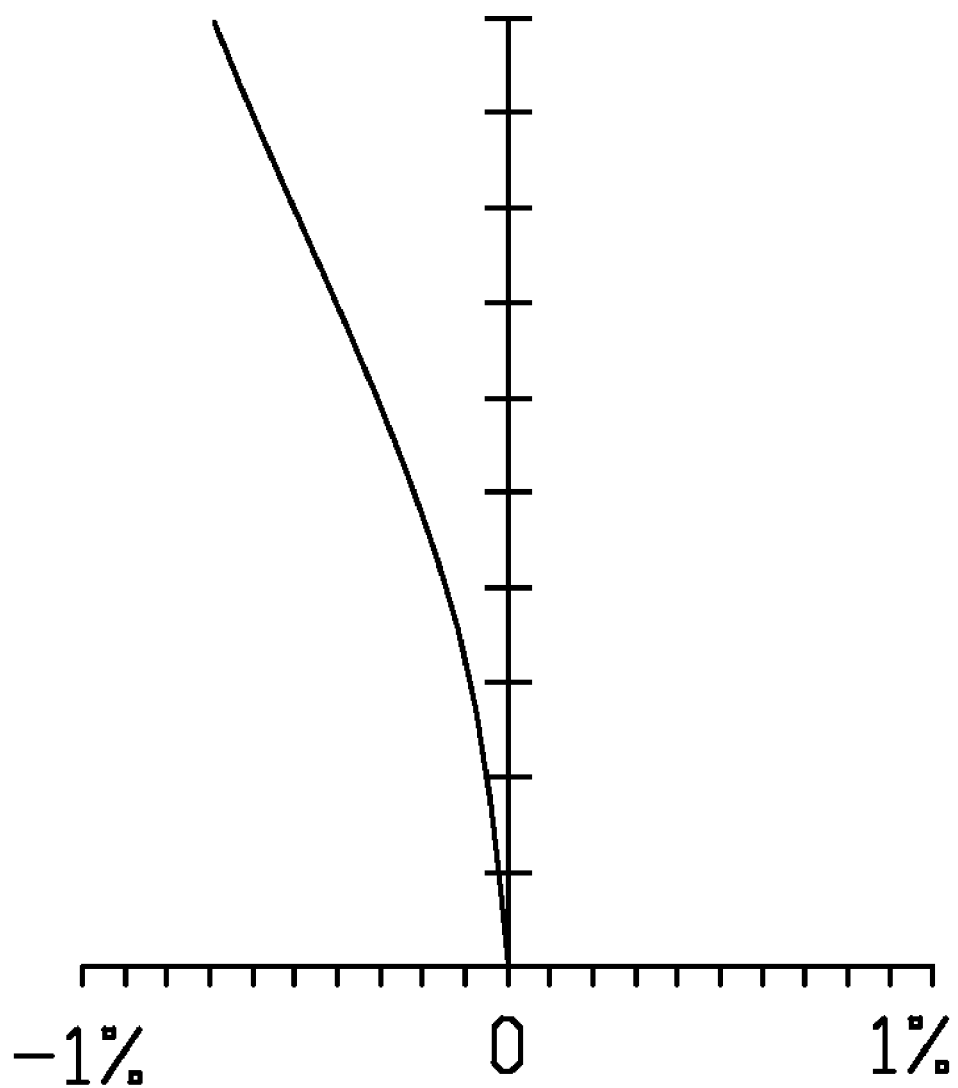
FIG. 7 is a distortion diagram of the projecting lens system in FIG. 5.

The projecting lens system 100 further includes an aperture stop 60 installed between the first lens 10 and the second lens 20. The aperture stop 60 is configured for adjusting light flux between the second lens 20 to the first lens 10. In addition, the aperture stop 60 facilitates uniform light transmission when light passes the second lens 20 and thus corrects coma aberrations of the second lens 20. To save on production cost and reduce the total length of the projecting lens system 100, the The spherical aberration diagram, the field curvature diagram, and the distortion diagram of the second embodiment in the projecting lens system 100 are respectively shown in FIGS. 5~7. Spherical aberrations of line g ($\lambda$=486 nm) and line d ($\lambda$=587 nm) and line c ($\lambda$=656 nm) are shown in FIG. 5. Generally, the spherical aberration of visible light (with a wavelength between 400~700 nm) of the projecting lens system 100 in the second embodiment is kept within a range of −2 mm to 2 mm. The sagittal field curvature and tangential field curvature shown in FIG. 6 are kept within a range of −1 mm to 1 mm. The distortion shown in FIG. 7 falls within a range of −1% to 1%. Obviously, the spherical aberration, field curvature, and distortion are well controlled in the second embodiment of the projecting lens system 100.

Embodiment 3: The following table 3 shows specifications of a third embodiment of the projecting lens system 100, wherein TT=125 mm; f=84.53 mm; $BFL_3$=69.84 mm; $f_4$=130.81 mm; $AVE(Vb_{1-3})$59.4372; $F_{No}$=3.44; 2$\omega$=33°.

TABLE 3

| Projecting lens system 100 | Radius of curvature(mm) | Thickness(mm) | Reflective index | Abbe number |
|---|---|---|---|---|
| Screen-side surface of the first lens 10 | 25.14608 | 12.8 | 1.651597 | 58.5507 |
| SLM-side surface of the first lens 10 | 34.77398 | 14.76302 | — | — |
| Aperture stop 60 | ∞ | 9.944934 | — | — |
| Screen-side surface of the second lens 20 | −13.71061 | 9.668122 | 1.784696 | 26.2912 |
| SLM-side surface of the second lens 20 | −22.50503 | 1.3 | — | — |
| Screen-side surface of the third lens 30 | ∞ | 9.698434 | 1.62041 | 60.3236 |
| SLM-side surface of the third lens 30 | −43.81694 | 49.42549 | — | — |
| Screen-side surface of the fourth lens 40 | 92.80003 | 12.8 | 1.743972 | 44.8504 |
| SLM-side surface of the fourth lens 40 | ∞ | 3 | — | — |

Figure 8:
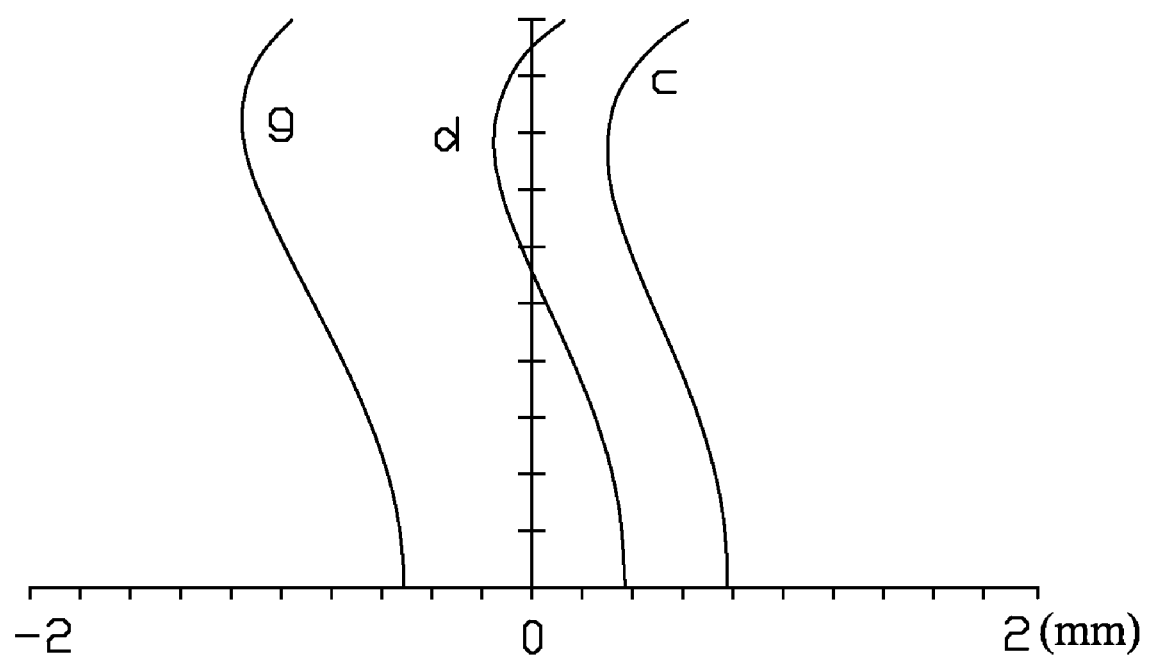
FIG. 8 is a spherical aberration diagram of the projecting lens system according to a third present embodiment.
Figure 9:
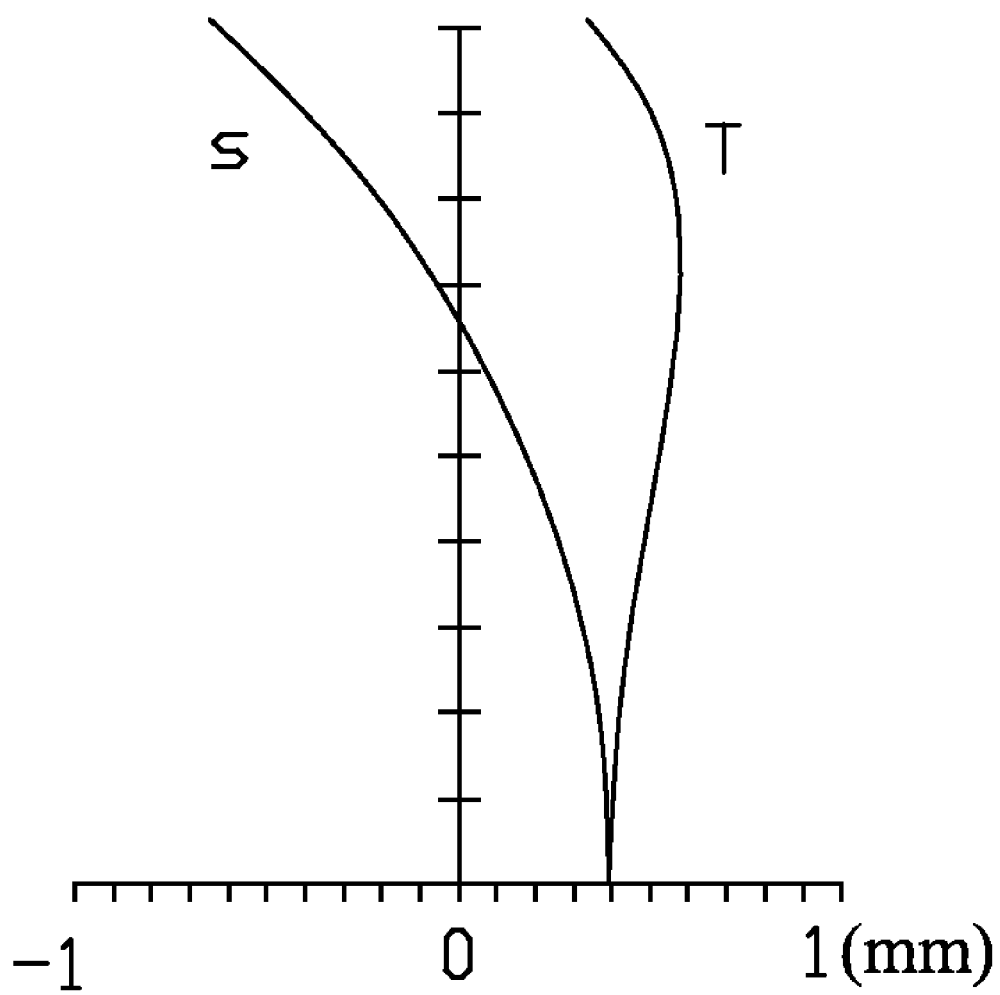
FIG. 9 is a field curvature diagram of the projecting lens system in FIG. 8.
Figure 10:
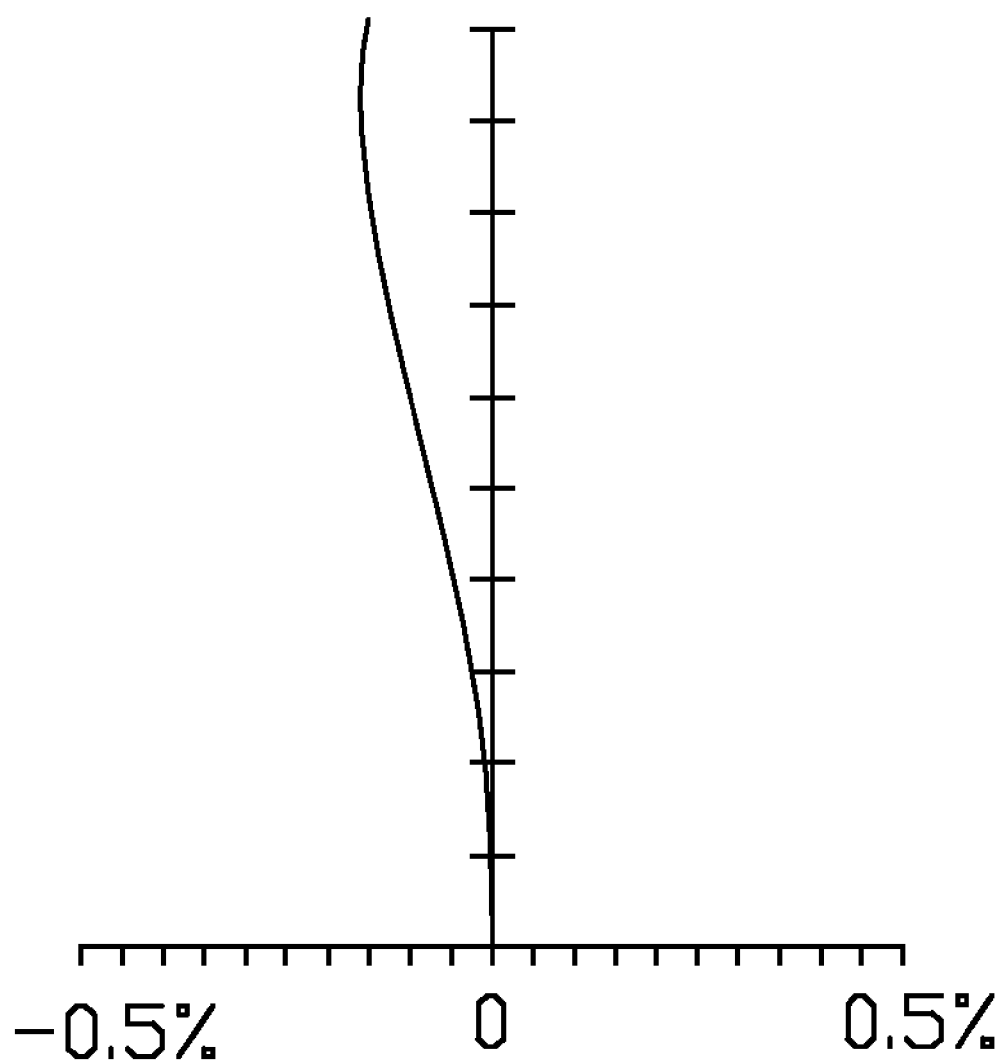
FIG. 10 is a distortion diagram of the projecting lens system in FIG. 8.

The spherical aberration diagram, the field curvature diagram, and the distortion diagram of the third embodiment in the projecting lens system 100 are respectively shown in FIGS. 8~10. Spherical aberrations of line g (λ=486 nm) and line d (λ=587 nm) and line c (λ=656 nm) are shown in FIG. 8. Generally, the spherical aberration of visible light (with a wavelength between 400~700 nm) of the projecting lens system 100 in the third embodiment is kept within a range of −2 mm to 2 mm. The sagittal field curvature and tangential field curvature shown in FIG. 9 are kept within a range of −1 mm to 1 mm. The distortion shown in FIG. 10 falls within a range of −0.5% to 0.5%. Obviously, the spherical aberration, field curvature, and distortion are well controlled in the third embodiment of the projecting lens system 100.

The aforementioned projecting lens system 100 has a compact size and excellent optical performance to meet the trend toward miniaturizing projecting lens systems. The projecting lens system 100 works to keep chromatic aberrations at a minimum while reducing the total length of the projecting lens system.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A projecting lens system comprising, in this order from the screen-side thereof:
   a first lens positive in power,
   a second lens negative in power,
   a third lens positive in power, and
   a fourth lens positive in power;
the projecting lens system meeting a criteria of 1.4<TT/f<1.7; where TT denotes a total length of the projecting lens system and f denotes an effective focal length of the projecting lens system,
   wherein the specifications of the projecting lens are listed in the following table:

| Protecting lens system 100 | Radius of curvature (mm) | Thickness (mm) | Reflective index | Abbe number |
|---|---|---|---|---|
| Screen-side surface of the first lens 10 | 28.05737 | 12 | 1.696797 | 55.5322 |
| SLM-side surface of the first lens 10 | 35.18796 | 22.53765 | — | — |
| Aperture stop 60 | ∞ | 7.933927 | — | — |
| Screen-side surface of the second lens 20 | −14.61593 | 9.688149 | 1.84666 | 23.7779 |
| SLM-side surface of the second lens 20 | −22.67261 | 1 | — | — |
| Screen-side surface of the third lens 30 | ∞ | 12 | 1.696797 | 55.5322 |
| SLM-side surface of the third lens 30 | −47.49873 | 53.24028 | — | — |
| Screen-side surface of the fourth lens 40 | 67.60116 | 12 | 1.5168 | 64.1673 |
| SLM-side surface of the fourth lens 40 | ∞ | 3 | — | — | wherein TT=135 mm, f=82.91 mm, BFL3=66.83 mm, f4=124.74 mm, AVE (Vb1-3)=55.5322, FNo=3.41, and 2ω=33.72°, where TT denotes a total length of the projecting lens system, f represents a focal length of the projecting lens system, BFL3 denotes a back focal length of the projecting lens system, AVE (Vb1-3) denotes an average value of Abbe numbers of the first lens and the third lens, FNo represents the aperture F-number, and 2ω represents a field angle of the projecting lens system.

2. A projecting lens system comprising, in this order from the screen-side thereof:
   a first lens positive in power,
   a second lens negative in power,
   a third lens positive in power, and
   a fourth lens positive in power;
the projecting lens system meeting a criteria of 1.4<TT/f<1.7; where TT denotes a total length of the projecting lens system and f denotes an effective focal length of the projecting lens system,
   wherein the specifications of the projecting lens are listed in the following table:

| Projecting lens system 100 | Radius of curvature(mm) | Thickness(mm) | Reflective index | Abbe number |
| --- | --- | --- | --- | --- |
| Screen-side surface of the first lens 10 | 25.25499 | 12.5 | 1.62041 | 60.3236 |
| SLM-side surface of the first lens 10 | 32.98193 | 71.5604 | — | — |
| Aperture stop 60 | ∞ | 8.639082 | — | — |
| Screen-side surface of the second lens 20 | −13.55623 | 8.940455 | 1.755201 | 27.5795 |
| SLM-side surface of the second lens 20 | −20.87062 | 1 | — | — |
| Screen-side surface of the third lens 30 | ∞ | 12.5 | 1.62041 | 60.3236 |
| SLM-side surface of the third lens 30 | −43.81359 | 51.76006 | — | — |
| Screen-side surface of the fourth lens 40 | 93.72847 | 12.6 | 1.743972 | 44.8504 |
| SLM-side surface of the fourth lens 40 | ∞ | 3 | — | — | wherein TT=130 mm, f=82.52 mm, BFL3=66.86 mm, f4=125.98 mm, AVE (Vb1-3)=60.3236, FNo=3.41, and 2ω=34°, where TT denotes a total length of the projecting lens system, f represents a focal length of the projecting lens system, BFL3 denotes a back focal length of the projecting lens system, AVE (Vb1-3) denotes an average value of Abbe numbers of the first lens and the third lens, FNo represents the aperture F-number, and 2ω represents a field angle of the projecting lens system.

3. A projecting lens system comprising, in this order from the screen-side thereof:

a first lens positive in power,
a second lens negative in power,
a third lens positive in power, and
a fourth lens positive in power;
the projecting lens system meeting a criteria of 1.4<TT/f<1.7; where TT denotes a total length of the projecting lens system and f denotes an effective focal length of the projecting lens system,
wherein the specifications of the projecting lens are listed in the following table:

TABLE 3

| Projecting lens system 100 | Radius of curvature(mm) | Thickness(mm) | Reflective index | Abbe number |
| --- | --- | --- | --- | --- |
| Screen-side surface of the first lens 10 | 25.14608 | 12.8 | 1.651597 | 58.5507 |
| SLM-side surface of the first lens 10 | 34.77398 | 14.76302 | — | — |
| Aperture stop 60 | ∞ | 9.944934 | — | — |
| Screen-side surface of the second lens 20 | −13.71061 | 9.668122 | 1.784696 | 26.2912 |
| SLM-side surface of the second lens 20 | −22.50503 | 1.3 | — | — |
| Screen-side surface of the third lens 30 | ∞ | 9.698434 | 1.62041 | 60.3236 |
| SLM-side surface of the third lens 30 | −43.81694 | 49.42549 | — | — |
| Screen-side surface of the fourth lens 40 | 92.80003 | 12.8 | 1.743972 | 44.8504 |
| SLM-side surface of the fourth lens 40 | ∞ | 3 | — | — | wherein TT=125 mm f=84.53 mm, BFL3=69.84 mm, f4=130.81 mm, AVE (Vb1-3)=59.4372, FNo=3.44, and 2ω=33° where TT denotes a total length of the projecting lens system, f represents a focal length of the projecting lens system, BFL3 denotes a back focal length of the projecting lens system, AVE (Vb1-3) denotes an average value of Abbe numbers of the first lens and the third lens, FNo represents the aperture F-number, and 2ω represents a field angle of the projecting lens system.

* * * * *